(12) United States Patent
Kabasawa

(10) Patent No.: US 7,382,696 B2
(45) Date of Patent: Jun. 3, 2008

(54) OPTICAL PICK-UP DEVICE

(75) Inventor: Hidetoshi Kabasawa, Saitama (JP)

(73) Assignee: Teac Corporation, Tokyo (JP)

( * ) Notice: Subject to any disclaimer, the term of this patent is extended or adjusted under 35 U.S.C. 154(b) by 652 days.

(21) Appl. No.: 10/960,645

(22) Filed: Oct. 7, 2004

(65) Prior Publication Data

US 2005/0078570 A1  Apr. 14, 2005

(30) Foreign Application Priority Data

Oct. 8, 2003 (JP) ............................. 2003-349721

(51) Int. Cl.
*G11B 7/00* (2006.01)
(52) U.S. Cl. .................................. 369/44.14; 369/44.32
(58) Field of Classification Search ............. 369/44.15, 369/44.16, 44.11, 44.14, 44.32
See application file for complete search history.

(56) References Cited

U.S. PATENT DOCUMENTS

| 5,892,628 | A  | * | 4/1999 | Ikari ........................... 359/813 |
| 6,747,921 | B2 |   | 6/2004 | Wakabayashi et al. |
| 6,904,607 | B2 | * | 6/2005 | Wada ........................... 720/684 |
| 7,102,825 | B2 | * | 9/2006 | Uno et al. ................... 359/641 |
| 2003/0161252 | A1 | * | 8/2003 | Sugawara ................... 369/244 |

FOREIGN PATENT DOCUMENTS

| JP | 10-124895 A | 5/1998 |
| JP | 11-306573 A | 11/1999 |
| JP | 11-312327   | 11/1999 |

\* cited by examiner

*Primary Examiner*—Nabil Hindi
(74) *Attorney, Agent, or Firm*—Weingarten, Schurgin, Gagnebin & Lebovici LLP

(57) ABSTRACT

The present invention provides an optical pick-up device capable of suppressing the inclination of a lens actuator in the jitter direction caused by the variation of the ambient temperature thereof to stably record or reproduce information to or from an optical disk. In the optical pick-up device, a supporting member 106 for fixing one end of each of suspension members 105 is arranged on a rear side of a suspension holder 2 fixed to a yoke base 103, and an object lens 102 is displaced by servo-controlling a lens holder 101 for holding the other ends of the suspension members in an electromagnetic driving manner to adjust the irradiation position of a beam spot on an optical disk. The suspension holder 2 is formed of a plurality of members having different coefficients of linear expansion, and the members having a higher coefficient of linear expansion are arranged on the rear side of the suspension holder 2. Therefore, the supporting member 106 is displaced by the linear expansion of the members having a higher coefficient of linear expansion according to the variation of temperature, thereby suppressing inclination of a lens actuator L.

12 Claims, 7 Drawing Sheets

OPTICAL PICK-UP DEVICE

This application claims priority to a Japanese application No. 2003-349721 filed Oct. 8, 2003.

BACKGROUND OF THE INVENTION

1. Field of the Invention

The present invention relates to an optical pick-up device for recording or reproducing information to or from an optical disk that is provided in an optical disk device for driving optical discs (for example, CD-R/RW and DVD-R/RW/RAM/+R/+RW) as recording media for recording a large amount of information by information processing apparatuses, such as various computer systems.

2. Description of the Related Art

An optical pick-up device in an optical disk device for driving optical disks is constructed by a combination of various components of an optical system to form a beam spot on a recording surface of an optical disk. FIG. 6 is a view schematically illustrating the general structure of a conventional optical pick-up device. In FIG. 6, reference character A denotes an actuator assembly of the optical pick-up device, reference character B denotes a semiconductor laser hologram unit for DVD, and reference character C denotes a semiconductor laser hologram unit for CD. An optical beam irradiated from the semiconductor laser hologram unit B or the semiconductor laser hologram unit C follows the light path to an object lens 102 of an actuator assembly A via optical components included in a mirror system and a lens system and then forms a beam spot on a recording surface of an optical disk.

As shown in FIGS. 7 and 8, in the actuator assembly A, one side ends of six suspension members 105 are fixed to both longitudinal end portions of a lens holder 101 for holding the object lens 102 at top, middle, and bottom positions in pairs, and the other side ends of the suspension members 105 are fixed to a supporting member 106 arranged on the rear side of a suspension holder 104 fixed to a yoke base 103. In this way, since the lens holder 101 is elastically supported by the suspension members 105 in a cantilever manner, the lens holder 101 can rock vertically and horizontally. In addition, the supporting member 106 is generally composed of a printed circuit board (PCB) having low rigidity and has a floating structure for suppressing, for example, secondary resonance generated when the lens holder is driven in the focus direction and the tracking direction. The PCB, serving as the supporting member 106, is connected to a control circuit (not shown) through a flexible printed circuit (FPC) 107 and a joining terminal 108.

A lens actuator L is constructed such that the lens holder 101 is provided with a focus driving coil 109 and a tracking driving coil 110, and the entire of the lens holder 101 is servo-controlled in the focus direction (the Y-axial direction indicated by an arrow) and the tracking direction (the X-axial direction indicated an arrow) by an electromagnetic driving manner using the interaction between the coils 109 and 110 and the magnetic field of permanent magnets 111a, 111b, 112a, and 112b fixed to the yoke base 103. In addition, the focus driving coil 109 is divided into two parts so as to additionally function as a driving coil for tilt servo control for adjusting the inclination of the lens holder 101 in the radial direction. In this case, the inclination of the lens holder 101 in the radial direction is adjusted by controlling the balance of a driving current to be supplied to the focus driving coils 109a and 109b. The technique of suppressing the inclination of the lens holder by adjusting the current passing through two focus driving coils is disclosed in, for example, Japanese Unexamined Patent Application Publication No. 11-312327 (Patent Document 1).

The ends of the focus driving coil 109 and the tracking driving coil 110 are electrically connected to the six suspension members 105, respectively, and the other ends of the six suspension members 105 are held by a gel-type buffering material 113 filled in the suspension holder 104. In addition, the other ends thereof are soldered on a circuit board of the supporting member 106. Further, the six suspension members 105 are connected to both longitudinal end portions of the lens holder 101 at top, middle, and bottom positions in three pairs. For example, two top suspension members are connected to the focus driving coil 109a, two middle suspension members are connected to the focus driving coil 109b, and two bottom suspension members are connected to the tracking driving coil 110. In addition, a driving current is supplied through the suspension members 105 connected to the respective driving coils, based on the control information obtained from an optical disk.

As shown in FIG. 10, in the actuator assembly A having the above-mentioned cantilever supporting structure by the suspension members 105, the lens holder 101 is maintained in a horizontal state at normal temperature by the gel-type buffering material 113 filled in the suspension holder 104 and the supporting members 106. As a result, the beam spot of an optical beam concentrated on a recording surface 114a of an optical disk 114 is formed in an optimum circular shape.

In an optical disk device for recording information on an optical disk, the output level of an optical beam irradiated from the semiconductor laser hologram unit B or the semiconductor laser hologram unit C is generally composed of three kinds of levels, that is, a reproduction level, a removal level, and a recording level, and the respective output levels of the optical beam satisfy the following relationship: reproduction level<removal level<recording level.

When reproducing the information recorded on the optical disk 114, an optical beam of the reproduction level is irradiated from the semiconductor laser hologram unit B or the semiconductor laser hologram unit C and is then concentrated on the recording surface 114a of the optical disk. Since the optical beam of the reproduction level has the lowest output level, the optical beam does not much affect the ambient temperature of the actuator assembly A. Therefore, as shown in FIG. 10, the horizontal state of the lens holder 101 is maintained, and thus operating conditions thereof are stabilized.

However, when recording information on the optical disk 114, since an optical beam of the recording level having the highest output level is irradiated from the semiconductor laser hologram unit B or the semiconductor laser hologram unit C and is then concentrated on the recording surface 114a of the optical disk, the heat value of the semiconductor laser hologram unit B or the semiconductor laser hologram unit C increases, and the amount of heat generated from an LSI of an optical disk drive increases, which results in a burst increase in the ambient temperature of the actuator assembly A. The ambient temperature of the actuator assembly A when information is recorded on the optical disk 114 may rise up to ° Centigrade (140° Fahrenheit). When such a condition is maintained, the elasticity of the supporting member 106 having the floating structure and the holding force of the gel-type buffering material 113 are lowered by heat. Therefore, a floating portion of the supporting member 106 is bent by the weight of the lens holder 101 as shown in FIG. 9, which causes the lens actuator L to be inclined in the direction of gravitation (the jitter direction) as shown in FIG. 11. When the lens actuator L is inclined in the jitter direction, the beam spot of an optical beam concentrated on the recording surface 114a of the optical disk 114 has an elliptic shape, so that coma aberration occurs. As a result, the recording efficiency or reproducing efficiency of information deteriorates. Particularly, in an optical disk device for recording information DVD-type optical disks having high recording density, it is probable that the recording or reproduction of information will not be performed by the slight inclination of the lens actuator L caused by the variation of temperature.

Further, a method of controlling the inclination of the lens actuator in the jitter direction using the technique disclosed in Patent Document 1 can be considered. However, in this method, additional driving coils and magnets for controlling the inclination of the lens actuator in the jitter direction are needed, and these driving coils and magnets are incorporated into the optical disk device as shown in FIG. 7. That is, a separate control system for controlling the inclination in the jitter direction must be constructed, which results in an increase in the size of the optical pick-up device and a complexity of structure thereof.

SUMMARY OF THE INVENTION

Accordingly, the present invention is designed to solve the above-mentioned problems, and it is an object of the present invention to provide an optical pick-up device capable of suppressing the inclination of a lens actuator in the jitter direction caused by the variation of the ambient temperature thereof so as to stably record or reproduce information to or from an optical disk.

Therefore, in order to achieve the above object, the present invention provides the following means. That is, as described in claim 1, a first aspect of the present invention provides an optical pick-up device in which a supporting member for fixing one end of each of suspension members is arranged on a rear side of a suspension holder fixed to a yoke base, and an object lens is displaced by servo-controlling a lens holder for holding the other ends of the suspension members in an electromagnetic driving manner so as to adjust the irradiation position of a beam spot on an optical disk. Here, the suspension holder is formed of a plurality of members having different coefficients of linear expansion, and the members having a higher coefficient of linear expansion are arranged on the rear side of the suspension holder.

Further, according to a second aspect of the present invention as described in claim 2, in the optical pick-up device according to claim 1, the suspension holder comprises a first member fixed to the yoke base and a second member having a coefficient of linear expansion higher than that of the first member and abutting on the supporting member, and the first member and the second member are integrated into one body.

Furthermore, according to a third aspect of the present invention as described in claim 3, in the optical pick-up device according to claim 2, the first member has an abutting portion for abutting on the supporting member, and the second member is arranged on an upper side of the abutting portion of the first member.

Moreover, according to a fourth aspect of the present invention as described in claim 4, in the optical pick-up device according to claim 2 or 3, the first member is made of a liquid crystal polymer, and the second member is made of polyamide resin.

According to the present invention described in claim 1, the suspension holder is formed of a plurality of members having different coefficients of linear expansion, and the members having a higher coefficient of linear expansion are arranged on the rear side of the suspension holder. Therefore, when the ambient temperature of the actuator assembly increases due to the heat generated from a semiconductor laser element, an LSI of an optical disk drive or the like, the members having a higher coefficient of linear expansion that constitute the suspension holder are more largely expanded in the jitter direction than the other members having a lower coefficient of linear expansion. Accordingly, the members having a higher coefficient of linear expansion can press the supporting member fixed to the rear side of the suspension holder in the jitter direction to correct the inclination of the lens actuator in the jitter direction. As a result, it is possible to suppress a variation in the inclination angle of the object lens, and thus to stably record or reproduce information to or from an optical disk.

Further, according to the present invention described in claim 2, the first member for fixing the suspension holder to the yoke base and the second member that has a coefficient of linear expansion higher than that of the first member and abuts on the supporting member are integrated into one body. Therefore, it is possible to allow the suspension holder to function as a mechanism for correcting a tilt in the jitter direction. In other words, since it is not necessary to additionally provide a servomechanism for correcting a tilt in the jitter direction, it is possible to prevent an increase in the size and manufacturing costs of the optical pick-up device.

Furthermore, according to the present invention described in claim 3, the second member is arranged on the upper side of the abutting portion of the first member abutting on the supporting member. Therefore, since the second member having a coefficient of linear expansion higher than that of the first member presses an upper half portion of the supporting member in the jitter direction, it is possible to more effectively correct the inclination of the lens actuator.

Moreover, according to the present invention described in claim 4, the first member is made of a liquid crystal polymer, and the second member is made of polyamide resin. Therefore, it is possible to optimize conditions necessary for correcting the inclination of the lens actuator, such as coefficients of linear expansion.

DESCRIPTION OF THE PREFERRED EMBODIMENTS

Figure 1:
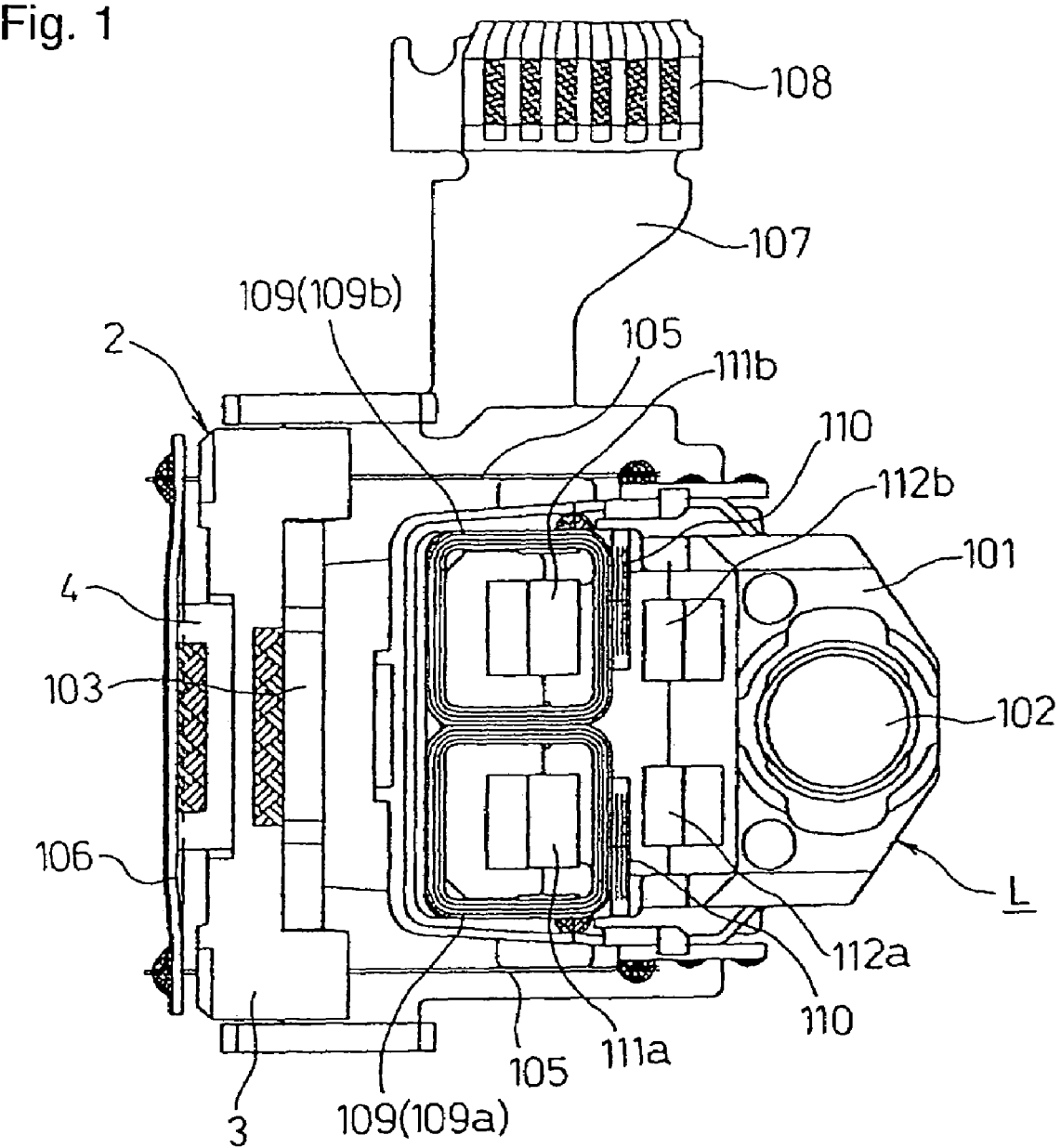
FIG. 1 is a plan view of an actuator assembly in an optical pick-up device according to the present invention.

In an optical pick-up device in which a supporting member for fixing one end of each of suspension members is arranged on a rear side of a suspension holder fixed to a yoke base and an object lens is displaced by servo-controlling a lens holder for holding the other ends of the suspension members in an electromagnetic driving manner to adjust the irradiation position of a beam spot on an optical disk, the suspension holder is formed of a plurality of members having different coefficients of linear expansion. In addition, when forming the suspension holder, a second member having a coefficient of linear expansion higher than that of a first member fixed to the yoke base is arranged on the rear side of the suspension holder, and the first member and the second member are integrated into one body.

Embodiments

Hereinafter, an embodiment according to the present invention will be described with reference to FIGS. 1 to 5. In addition, the same reference characters represent the same components in the respective figures, and a description thereof will be omitted for simplicity of explanation.

FIG. 1 is a plan view of an actuator assembly of an optical pick-up device according the present embodiment, and the basic structure of the actuator assembly is substantially the same as the above-mentioned actuator assembly A. In an actuator assembly 1 shown in FIG. 1, one side ends of six suspension members 105 are fixed to both longitudinal end portions of a lens holder 101 for holding an object lens 102 at top, middle, and bottom positions in pairs. The other end of each of the suspension members 105 is fixed, by soldering, to a supporting member located on the rear side of a suspension holder 2 fixed to a yoke base 103. In this way, the lens holder 101 is elastically supported by the suspension members 105 in a cantilever manner. Therefore, the lens holder 101 can rock horizontally and vertically.

Figure 2:
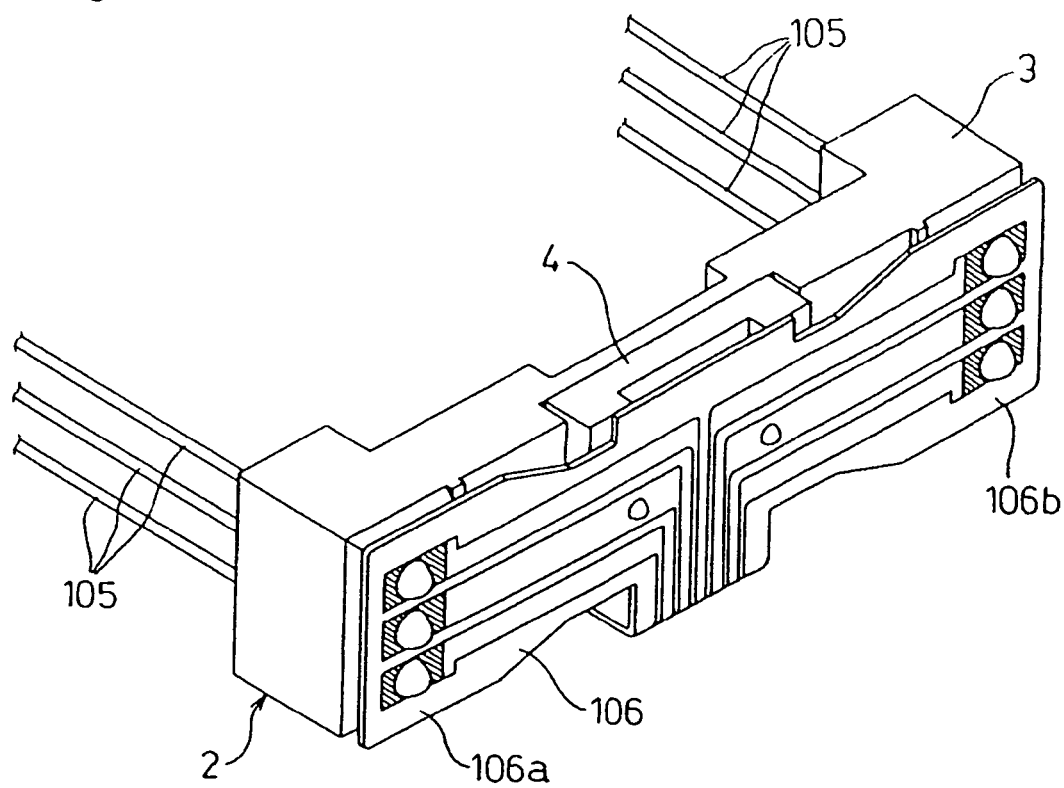
FIG. 2 is a perspective view illustrating the principal part of the actuator assembly in the optical pick-up device according to the present invention.

The supporting member 106 is composed of a printed circuit board (PCB) having low rigidity and has a floating structure for suppressing secondary resonance or the like generated when the lens holder is driven in the focusing and tracking directions. In other words, as shown in FIG. 2, positions of the supporting member 106 to where the suspension members 105 are fixed are floated so as not to bring into contact with the suspension holder 2. In addition, a gel-type buffering material may be filled between the suspension holder 2 and floating portions 106a and 106b of the supporting member 106.

Figure 3:
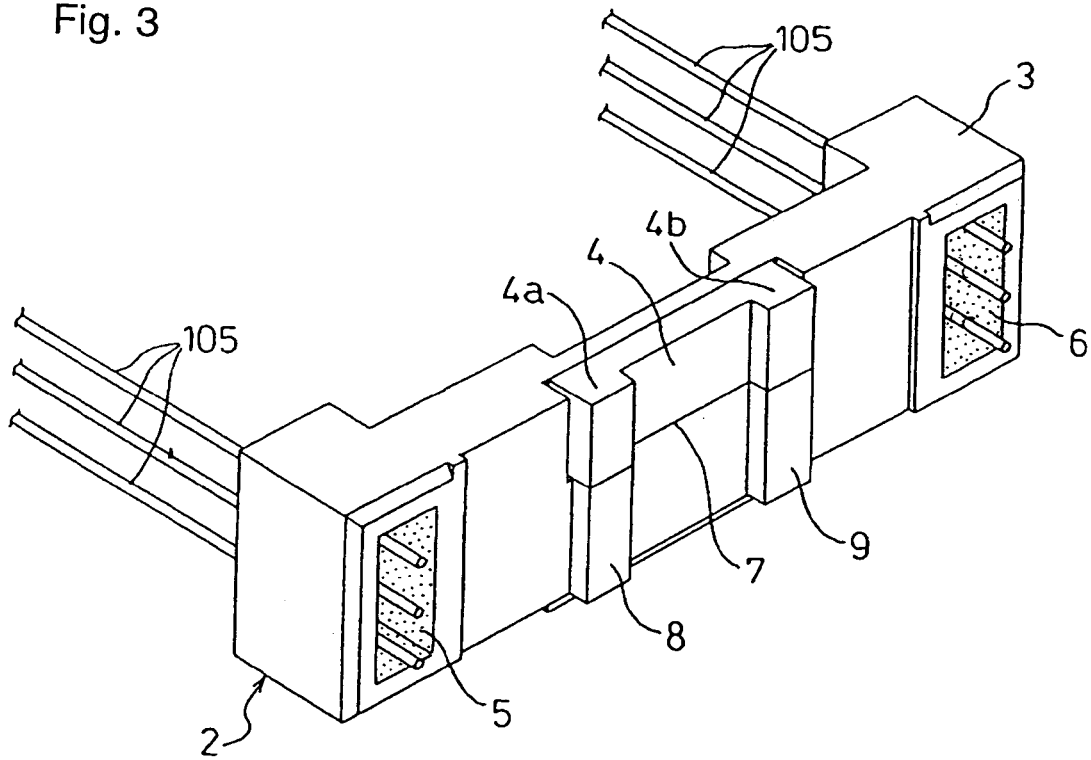
FIG. 3 is a perspective view of a suspension holder according to the present invention.

As shown in FIG. 3, the suspension holder 2 is constructed by integrating a suspension holder body 3 fixed to the yoke base 103 with an inclination correcting member 4 that is arranged on the rear side of the suspension holder 2 and abuts on the supporting member. In addition, the suspension holder body 3 and the inclination correcting member 4 are made of materials having different coefficients of linear expansion, respectively. As described later, a material forming the inclination correcting member 4 has a coefficient of linear expansion higher than that of a material forming the suspension holder body 3.

Holes 5 and 6 for insertion of the suspension members 105 are formed at both longitudinal end portions of the suspension holder body 3, and the gel-type buffering material is filled in the holes 5 and 6 for insertion of the suspension members. In addition, a bonding portion 7 for boding the inclination correcting member 4 is formed at the center of the suspension holder body 3, and the inclination correcting member 4 is bonded to the bonding portion 7 by, for example, an adhesive. In this case, the inclination correcting member 4 is bonded thereto such that the inclination correcting member 4 is largely linearly expanded in the jitter direction. In addition, the bonding between the suspension holder body 3 and the inclination correcting member 4 may be performed by screws at positions where the linear expansion of the inclination correcting member 4 is not obstructed, as well as the adhesive. Further, coinjection molding may be used.

The inclination correcting member 4 is formed in a 'U' shape so as to largely linearly expand in the jitter direction, and both end portions 4a and 4b thereof abut on the supporting member 106. In addition, abutting portions 8 and 9 abutting on the supporting member 106 are formed on the lower side of the bonding portion 7 of the suspension holder body 3 so as to coincide with the shapes of the both end portions 4a and 4b of the inclination correcting member 4. Further, the shapes of the abutting portions 8 and 9 do not necessarily coincide on the shapes with the both end portions 4a and 4b of the inclination correcting member 4.

The principle of correcting the inclination of a lens actuator L by the suspension holder 2 having the above-mentioned structure will now be described with reference to FIGS. 4 and 5.

Figure 4:
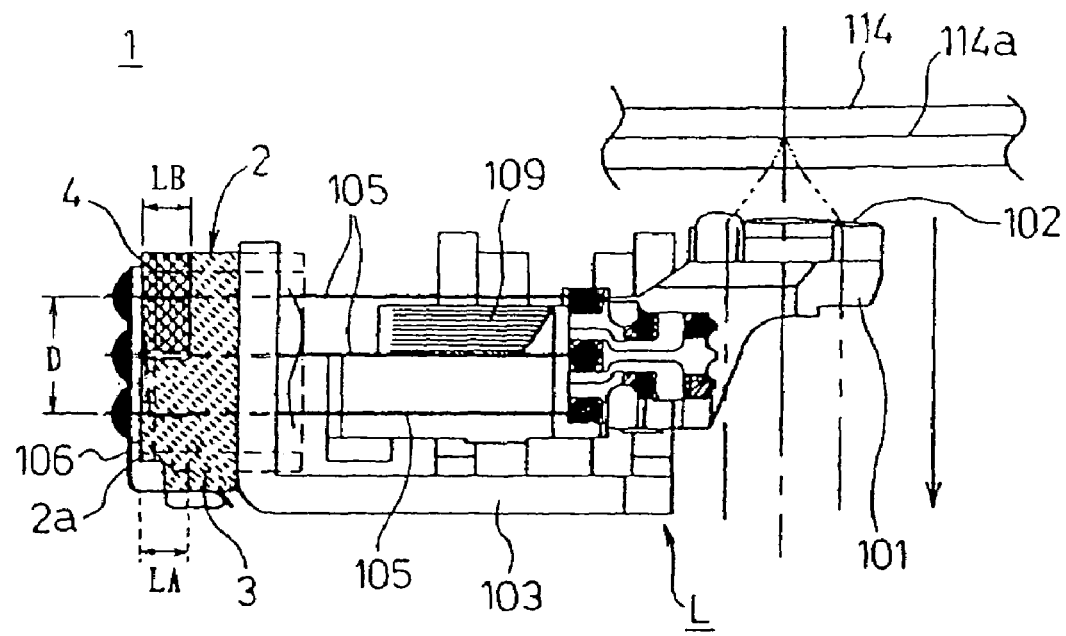
FIG. 4 is a side view illustrating the state of a lens actuator according to the present invention at normal temperature.

As shown in FIG. 4, when reproducing information recorded on an optical disk 114, an optical beam of a reproduction level having a low output level is irradiated from a semiconductor laser hologram unit B or a semiconductor laser hologram unit C, similar to a conventional art. Therefore, the heat value of the semiconductor laser hologram unit B or the semiconductor laser hologram unit C or the amount of heat generated from an LSI of an optical disk drive has a small effect on the ambient temperature of the actuator assembly 1, and thus the elasticity of the supporting member 106 or the holding force of the gel-type buffering material 113 is little reduced. Thus, the inclination of the lens actuator L is suppressed by the elasticity of the supporting member 106 or the holding force of the gel-type buffering material 113, so that the lens holder 101 is horizontally maintained, thereby stabilizing operating conditions. In this case, the position of the suspension holder 2 is also hardly changed.

Figure 5:
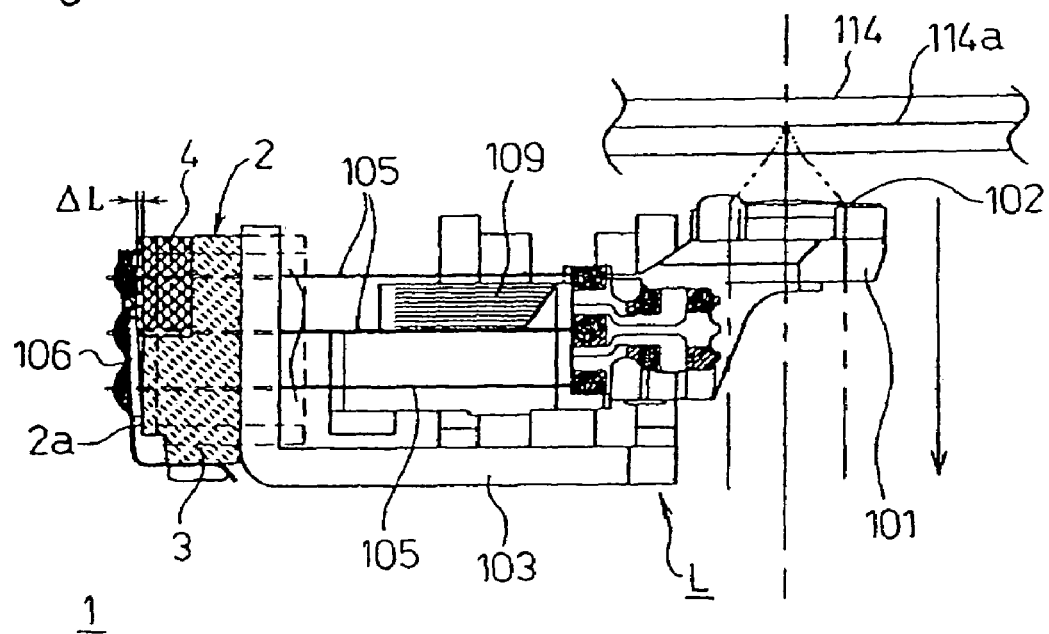
FIG. 5 is a side view illustrating the state of the lens actuator according to the present invention at a high temperature.
Figure 5:
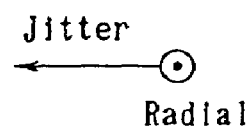
Figure 6:
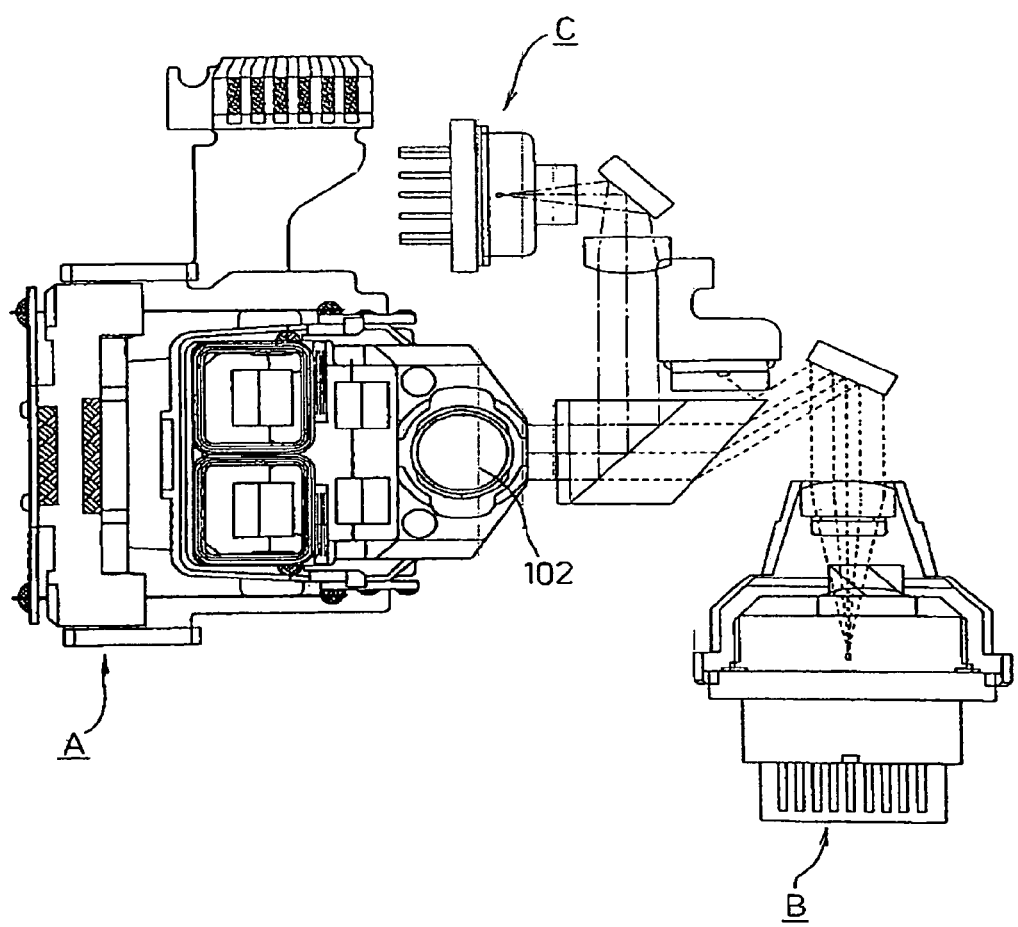
FIG. 6 is a plan view illustrating the structure of a conventional optical pick-up device.
Figure 7:
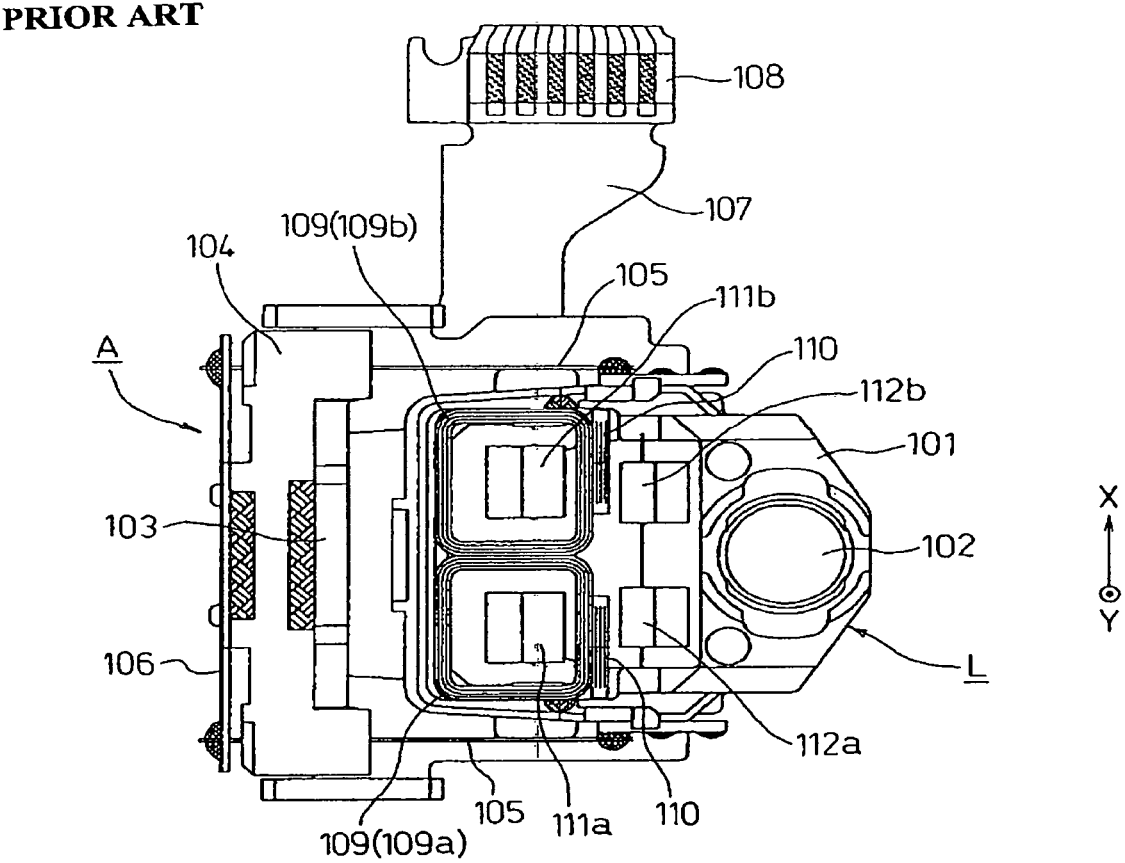
FIG. 7 is a plan view of a conventional actuator assembly.
Figure 8:
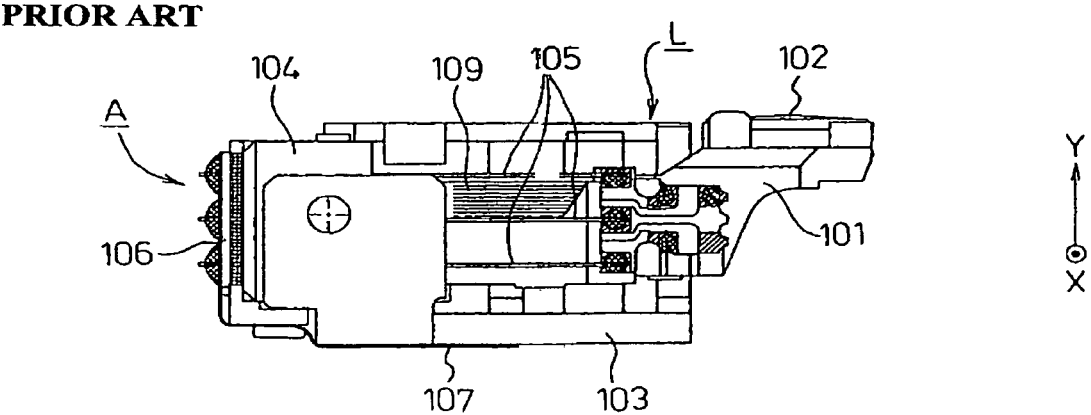
FIG. 8 is a side view of the conventional actuator assembly.
Figure 9:
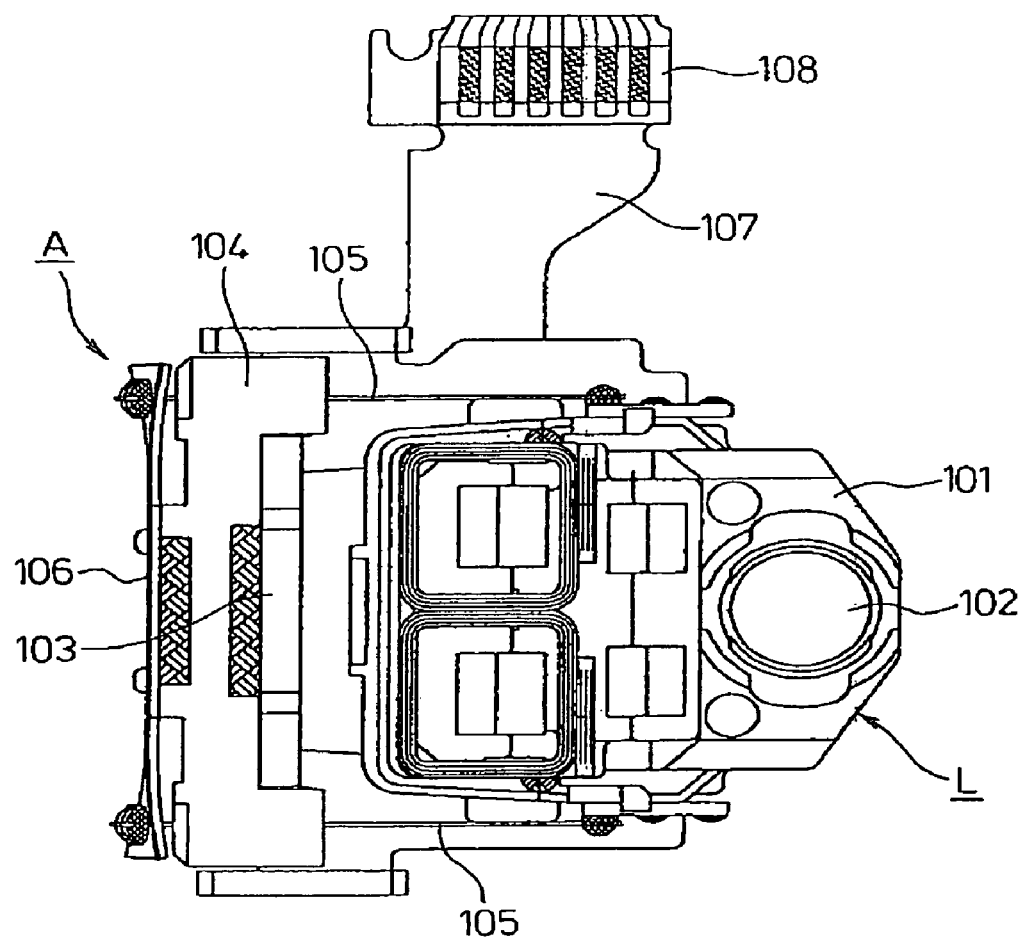
FIG. 9 is a plan view illustrating the bending of a supporting member caused by a variation of temperature.
Figure 10:
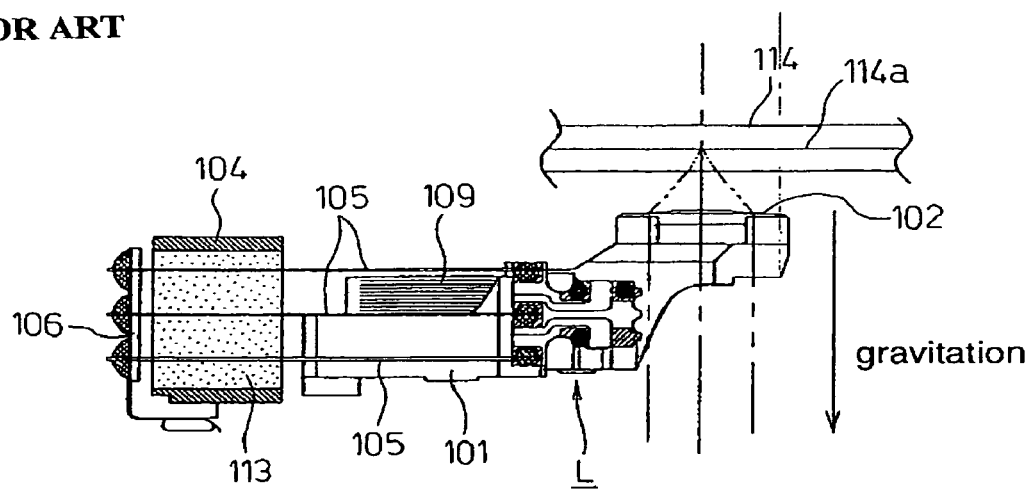
FIG. 10 is a side view illustrating the state of a conventional lens actuator at normal temperature.
Figure 11:
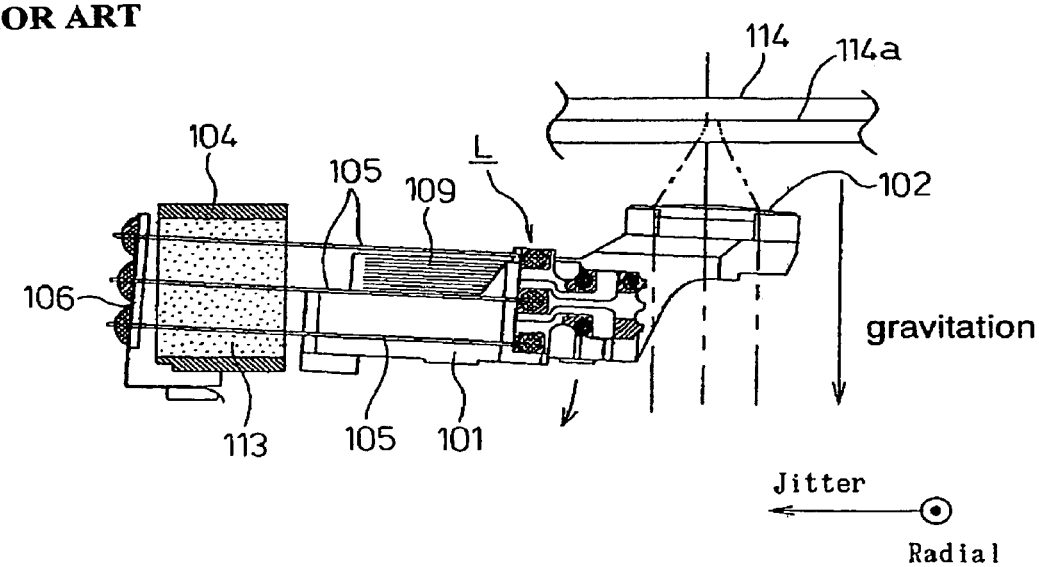
FIG. 11 is a side view illustrating the state of the conventional lens actuator at a high temperature.

Meanwhile, as shown in FIG. 5, when recording information on the optical disk 114, an optical beam of a recoding level having the highest output level is irradiated from the semiconductor laser hologram unit B or the semiconductor laser hologram unit C and is then concentrated on a recording surface 114a of the optical disk. Therefore, the heat value of the semiconductor laser hologram unit B or the semiconductor laser hologram unit C or the amount of heat generated from the LSI of the optical disk drive increases, and thus the ambient temperature of the actuator assembly 1 increases, which causes the lens actuator L to be inclined in the gravitational direction (the jitter direction) as in the conventional art. However, according to the optical pick-up device of the present invention, with an increase in the ambient temperature of the actuator assembly 1, the inclination correcting member 4 having a coefficient of linear expansion higher than that of the suspension holder body 3 is more largely expanded in the jitter direction than the suspension holder body 3. Therefore, the inclination correcting member 4 protrudes from a rear surface 2a of the suspension holder 2 by ΔL so as to press an upper half portion of the supporting member 106 in the jitter direction. Since a lower half portion of the supporting member 106 abuts on the abutting portions 8 and 9 formed in the suspension holder body 3, the lifting force for lifting up the lens actuator L in the direction opposite to gravitation is generated by the principle of leverage, with the abutting portions 8 and 9 as supporting points, by pressing the inclination correcting member 4 against the upper half portion of the supporting member 106. In other words, as shown in FIGS. 9 and 11, the force generated by the weight of the lens holder 101 to cause the supporting member 106 to be bent is canceled out by the pressing force generated by the linear expansion of the inclination correcting member 4, which results in suppressing the inclination of the lens actuator L as shown in FIG. 5. Therefore, even when the ambient temperature of the actuator assembly 1 increases, the inclination correcting member 4 is expanded with an increase in temperature to suppress the bending of the supporting member 106. Accordingly, the horizontal state of the lens holder 101 is maintained, thereby stabilizing operating conditions.

Here, the relationship between a material for forming the suspension holder 2 and the principle of the above-mentioned inclination correction will be described.

As described above, the suspension holder body 3 and the inclination correcting member 4 are made of materials having different coefficients of linear expansion, respectively, and a material forming the inclination correcting member 4 has a coefficient of linear expansion higher than that of a material forming the suspension holder body 3.

When the suspension holder body 3 is made of a material having a high coefficient of linear expansion, it has an effect on the characteristics of the lens actuator L. Therefore, it is preferable that the suspension holder body 3 be made of a material such as a liquid crystal polymer having a coefficient of linear expansion of about $0.1 \times 10^{-5}$ to $6.0 \times 10^{-5}$ for a temperature variation of 1° C.

Meanwhile, according to the present invention, the inclination correcting member 4 is made of a material having a coefficient of linear expansion higher than that of the material forming the suspension holder body 3. However, when the coefficient of linear expansion of the inclination correcting member 4 is extremely high, too much force is applied to the supporting member 106, resulting in overcorrection. Therefore, it is preferable to use a material such as polyamide resin (PA12) having a coefficient of linear expansion of about $10 \times 10^{-5}$ to $30 \times 10^{-5}$ for a temperature variation of 1° C.

When a liquid crystal polymer and polyamide resin are selected as materials for forming the suspension holder 2, it is necessary to select an optimum combination for obtaining the correction amount necessary for the inclination correction of the lens actuator L since each material has a proper selection range of a coefficient of linear expansion as described above. The correction amount necessary for correcting the inclination of the lens actuator L is calculated by the following Expression 1:

$$\text{correction amount } \theta = \tan^{-1}((\Delta B - \Delta A)/D). \quad \text{[Expression 1]}$$

Here, "ΔB" denotes the amount of thermal expansion of a material B and is expressed by the following Expression 2:

$$\Delta B = \text{the length } LB \text{ in the jitter direction} \times \quad \text{[Expression 2]}$$
$$\text{a coefficient } B \text{ of linear expansion} \times$$
$$\text{a temperature variation}$$

In addition, "ΔA" denotes the amount of thermal expansion of a material A and is expressed by the following Expression 3:

$$\Delta A = \text{the length } LA \text{ in the jitter direction} \times \quad \text{[Expression 3]}$$
$$\text{a coefficient } A \text{ of linear expansion} \times$$
$$\text{a temperature variation}$$

Further, "D" denotes the length of an effective focus direction in which the supporting member 106 is inclined. Hereinafter, a concrete example will be described.

An optical pick-up device mounted in an optical disk apparatus (hereinafter, referred to as 'a DVD recorder') for recording information on DVD-type optical disks will be described as an example. In the DVD recorder, a margin (a tolerance level) for the tilting angle of the lens actuator L is in the range of –12 minutes to +12 minutes with an optimum point as the reference. That is, when the lens actuator L is inclined at an angle more than ±12 minutes, the recording or reproduction of information can be unstably performed. Thus, it is possible to maintain the recording and reproducing performances of the device by suppressing the margin of the tilting angle of the lens actuator L by about ±α minutes.

Requisites for designing the actuator assembly 1 are to set the length LB of the inclination correction member 4 in the jitter direction to be 1 mm, to set the length LA of the suspension holder body 3 in the jitter direction corresponding to the length of the inclination correcting member 4 in the jitter direction to be 1 mm, and to the length D of the effective focus direction in which the supporting member 106 is inclined (a gap between an upper suspension member and a lower suspension member) to be 2.4 mm. Then, assuming that the actuator assembly 1 is used at a normal temperature of 25° C. and the ambient temperature of the actuator assembly 1 increases up to a maximum temperature of 60° C., that the suspension holder body 3 is made of a liquid crystal polymer having a coefficient of linear expansion of $0.2 \times 10^{-5}$, and that the inclination correcting member 4 is made of polyamide resin having a coefficient of linear expansion $30 \times 10^{-5}$, the amount of thermal expansion of the suspension holder body 3 (which is referred to as a material A) is calculated by Expression 3 as follows:

$$\Delta A = 1 \text{ [mm]} \times 0.2 \times 10^{-5} \times [/° \text{ C.}] \times 35 [° \text{ C.}] = 0.00007.$$

In addition, the amount of thermal expansion of the inclination correcting member 4 (which is referred to as a material B) is calculated by Expression 2 as follows:

$$\Delta B = 1 \text{ [mm]} \times 30 \times 10^{-5} \times [/° \text{ C.}] \times 35 [° \text{ C.}] = 0.0105.$$

The correction amount of the inclination of the lens actuator L is calculated from the amount of thermal expansion of the respective materials calculated as above based on Expression 1 as follows:

$$\text{correction amount } \theta = \tan^{-1}((0.0105 - 0.00007)/2.4)$$
$$= 0.25°.$$

Since 0.25 degree is 15 minutes, it is possible to correct the inclination of the lens actuator L by a maximum angle of 15 minutes in the actuator assembly 1 mounted in the DVD recorder when the suspension holder 2 is formed according to the above-mentioned conditions.

As can be clearly seen from the above, the inclination correcting member made of a material having a coefficient of linear expansion higher than that of a material forming the suspension holder body is expanded in the jitter direction according to the variation of the ambient temperature of the actuator assembly, so that the supporting member is pressed in the jitter direction, thereby suppressing the inclination of the lens actuator L. Thus, it is possible to suppress a variation in the inclination angle of an object lens caused by the variation of temperature and thus to obtain a good beam spot shape.

Further, since the inclination of the lens actuator is corrected by using the variation of the linear expansion of the material forming the suspension holder, it is not necessary to separately provide a servomechanism for correcting a tilt in the jitter direction and thus to realize a mechanism for correcting the tilt in the jitter direction at a low cost.

Furthermore, the present invention is not limited to the above-mentioned embodiment, and various modifications thereof can be made without departing from the scope of the appended claims and equivalents of the present invention.

For example, in the above-mentioned embodiment, the inclination correcting member 4 made of a material having a coefficient of linear expansion higher than that of a material forming the suspension holder body 3 is separately formed, and the suspension holder body 3 and the inclination correcting member 4 are bonded to each other to form the suspension holder 2. However, according to the present invention, it is preferable that a member having a coefficient of linear expansion higher than that of the suspension holder body 3 be arranged on the rear side of the suspension holder 2, that is, in a portion in which the supporting member 106 is arranged. Therefore, when a condition in which a coefficient of linear expansion of an adhesive for fixing the supporting member 106 to the suspension holder 2 is higher than that of the suspension holder body 3 is satisfied, the inclination correcting member 4 may be substituted for the adhesive.

In this case, it is not necessary to separately form the inclination correcting member 4 in order that the inclination correcting member 4 serves as the adhesive for fixing the supporting member 106 to the suspension holder 2, and it is possible to form the suspension holder 2 using a single material. Therefore, it is possible to prevent an increase in manufacturing costs and to simplify manufacturing processes.

Furthermore, as a similar technique having the same effects as the present invention, the six suspension members 105 may be constructed such that two upper suspension members of the six suspension members 105 have a lower coefficient of linear expansion and two lower suspension members thereof have a higher coefficient of linear expansion. In this method, since the two lower suspension members are more largely expanded than the two upper suspension members with an increase in the ambient temperature of the actuator assembly 1, the two lower suspension members lift up the lens actuator L in the direction opposite to gravitation to correct the inclination of the lens actuator. Thus, the horizontal state of the lens holder 101 is maintained, thereby stabilizing operating conditions thereof. Further, this principle can be applied to an optical pick-up device in which the lens holder 101 is elastically supported by four suspension members in a cantilever manner.

What is claimed is:

1. An optical pick-up device in which a supporting member for fixing one end of each of suspension members is arranged on a rear side of a suspension holder fixed to a yoke base, and an object lens is displaced by servo-controlling a lens holder for holding the other ends of the suspension members in an electromagnetic driving manner to adjust the irradiation position of a beam spot on an optical disk,
   wherein the suspension holder is formed of a plurality of members having different coefficients of linear expansion, and the members having a higher coefficient of linear expansion are arranged on the rear side of the suspension holder.

2. The optical pick-up device according to claim 1,
   wherein the suspension holder comprises a first member fixed to the yoke base and a second member having a coefficient of linear expansion higher than that of the first member and abutting on the supporting member, and the first member and the second member are integrated into one body.

3. An optical pick-up device in which a supporting member for fixing one end of each of suspension members is arranged on a rear side of a suspension holder fixed to a yoke base, and an object lens is displaced by servo-controlling a lens holder for holding the other ends of the suspension members in an electromagnetic driving manner to adjust the irradiation position of a beam spot on an optical disk,
   wherein the suspension holder comprises a first member having an abutting portion for abutting on the supporting member and fixed to the yoke base and a second member having a coefficient of linear expansion higher than that of the first member and abutting on the supporting member,
   wherein the second member is arranged on the rear side of the suspension holder and on an upper side of the abutting portion of the first member.

4. The optical pick-up device according to claim 2,
   wherein the first member is made of a liquid crystal polymer, and the second member is made of polyamide resin.

5. The optical pick-up device according to claim 3,
   wherein the first member is made of a liquid crystal polymer, and the second member is made of polyamide resin.

6. The optical pick-up device according to claim 3,
   wherein the first member and the second member are integrated into one body.

7. The optical pick-up device according to claim 1,
   wherein an inclination correcting member is structured and arranged on the rear side of the suspension holder in an abutting relationship with the supporting member.

8. The optical pick-up device according to claim 7,
wherein the inclination correcting member is formed in a U-shape, having a base portion and two end portions.

9. The optical pick-up device according to claim 8,
wherein the two end portions of the inclination correcting member have higher coefficients of linear expansion that the base portion and the suspension holder.

10. The optical pick-up device according to claim 7,
wherein the inclination correcting member is adapted to expand linearly in a jitter direction in the plane of the object lens.

11. The optical pick-up, device according to claim 8,
wherein the end portions of the inclination correcting member are adapted to expand linearly into an upper half portion of the abutting supporting member.

12. The optical pick-up device according to claim 7,
wherein the abutting supporting member is adapted to lift the object lens in a radial direction when the end portions of the inclination correcting member expand linearly in the jitter direction.

* * * * *